No. 646,922.  
E. A. SPERRY.  
STORAGE BATTERY.  
(Application filed Aug. 19, 1898.)  
(No Model.)

Patented Apr. 3, 1900.

WITNESSES:  
Budd Gray.  
M. C. Prendergast.

INVENTOR  
Elmer A. Sperry.

THE NORRIS PETERS CO., PHOTO-LITHO., WASHINGTON, D. C.

UNITED STATES PATENT OFFICE.

ELMER A. SPERRY, OF CLEVELAND, OHIO, ASSIGNOR TO THE CLEVELAND MACHINE SCREW COMPANY, OF SAME PLACE.

STORAGE BATTERY.

SPECIFICATION forming part of Letters Patent No. 646,922, dated April 3, 1900.

Application filed August 19, 1898. Serial No. 689,057. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Storage Batteries, of which the following is a specification.

My invention relates to an improvement in electric storage batteries; and it consists in certain arrangement of binder or envelop for the electrodes, means for holding the binders in place, also means for supporting the plates in cells, and other details of manufacture, all of which are illustrated in the accompanying drawings, in which—

Figure 1:
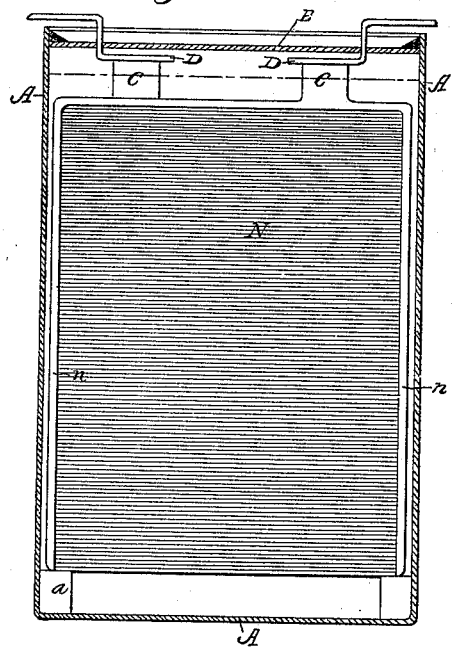
Figure 2:
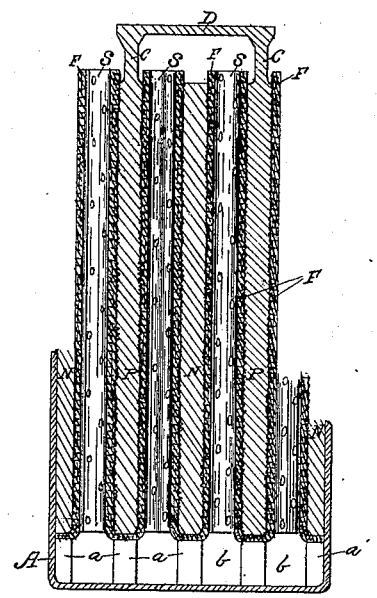
Figure 3:
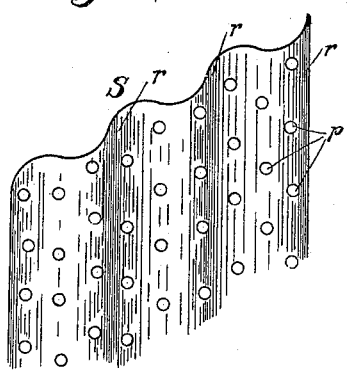
Figure 4:
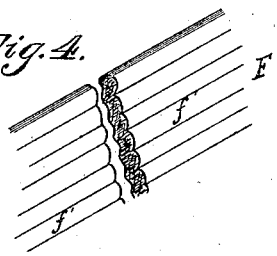
Figure 5:

Figure 1 is a sectional view of the battery, showing plates in position. Fig. 2 is a transverse section of portion of the battery. Fig. 3 illustrates the separator. Figs. 4 and 5 illustrate the binder or containing-envelop.

I have found that the active material which is placed upon the positive and negative plates, especially the former, is liable to be washed out of the pockets or other recesses provided to receive it in the electrode or battery-plate and accumulates in the bottom of the containing-cell and bridges over from the positive to the negative plates, constituting a conductor which in time will short-circuit the cell. This difficulty I have overcome in two ways—viz., by building the plates in such a way that they may be supported by their edges and by having their indented active-material-holding surface flanked on either edge by a solid portion, and under this solid portion is located independent supporting-lugs, which may be independent from the case, but preferably are formed from the material constituting the case or cell. By being thus formed they may be independent from each other and separated by free spaces, as shown in Fig. 2, in which A indicates the containing-cell, $a$ indicates the supporting-lugs, and $b\ b$ the free spaces between lugs. On these lugs rest the negative plates N N N and the positive plates P P. The end lugs—as, for instance, $a'$—will be seen to be facing the side of the cell and form part thereof. In Fig. 1 may be seen one of the plates—for instance, the negative N—flanked by the solid edges $n\ n$, which may or may not also cross the top and communicate with the terminal C. These terminals may also be seen in Fig. 2, where they are shown as being united by a connector D. The cell is provided with a cover E, through which the projection of the connector is run in the usual manner.

Coming now to the binding-envelop for the plates, supplied, preferably, to the positive plate or plates, I prefer to make these envelops of a fibrous material, with fibers taking up a certain direction and lying parallel within the sheet, and I also prefer to make the sheet ribbed to still further increase its stiffness. The ribs may be parallel with the fibers, which arrangement is preferred. The fibrous material preferably consists of sulfite cellulose fiber and is of such a nature as to be easily permeable by the electrolyte of the cell. This fibrous envelop is shown in Figs. 2, 4, and 5 at F, the ribs being illustrated by $f'f''$, Fig. 4, and the fibers by $fff$, Fig. 5. I prefer to treat this fiber with sulfur fumes during process of its manufacture and to prepare it in sheets long enough to extend over both surfaces and the bottom of the battery-plates, being bent and folded around the bottom, as shown in Fig. 2. Outside of this binder or fiber sheet I prefer to place some spacing arrangement—such, for instance, as a corrugated elastic material impermeable to the electrolyte—for example, hard rubber or celluloid—and I further prefer that this material be perforated, as is illustrated at S, Fig. 3, the corrugations being shown at $r\ r$ and the perforations by $p\ p$.

I am aware that asbestos material has been used with ribs attempted to be raised and maintained upon one face; but the ribs were for an entirely independent purpose of providing free electrolyte-space and were away from the face of the electrode. In the present construction the ribs are preferably placed against or in contact with the electrode for the purpose of not only catching and holding any material which tends to disintegrate from the surface thereof, but also to give better circulation of the electrolyte at the absolute face of the active material. Again, I fold the sheet around the lower end for the further purpose of catching and holding any active material that may tend to disintegrate from the plate and which has succeeded in falling or sinking so far as the bottom of the plate.

The term "parallel" as applied to the fibers constituting the sheet or sheets herein referred to does not of necessity mean that every fiber in the sheet takes up one and a single direction; but it means that a majority or nearly all the fibers or the larger fibers take up a single direction within the sheet and are therefore parallel.

It will be readily understood that while it is designed to use the above parts in the relation shown, yet some may be used without the others, and the invention extends to such use. It will, furthermore, be readily understood that the construction and arrangement may be varied without departing from the spirit of the invention.

Having thus described my invention, what I claim, and desire to secure by Letters Patent, is—

1. In a storage battery, a battery-plate, containing active material, presenting a face or faces of considerable area, a shield or retainer for such material, consisting of a homogeneous sheet of fibrous material, the fibers in which are parallel, permeable to the electrolyte, provided with at least one indented or ribbed surface and a separator of material impermeable to the electrolyte, having projecting partitions pressing the sheet at intervals in its extent and in lines disposed at a substantial angle to the ribs, serving to hold the sheet against the face or faces described.

2. In a storage battery, a battery-plate containing active material, presenting a face or faces of considerable area, a shield or retainer for such material, consisting of a homogeneous sheet of fibrous material, the fibers in which are parallelly disposed, provided with at least one indented or ribbed surface, the ribs being parallel to the fibers, the sheet being permeable to the electrolyte and a corrugated separator pressing the sheet against said face or faces, having the corrugations disposed at a substantial angle to the direction of the fiber.

3. In a storage battery, a battery-plate, containing active material, presenting a face or faces of considerable area, a shield or retainer for such material, consisting of a homogeneous sheet of fibrous material, the fibers in which are parallelly disposed, provided with at least one indented or ribbed surface, the ribs being parallel to the fibers, the sheet being permeable to the electrolyte and an elastic separator pressing the sheet at intervals in its extent against the face or faces described, the said elastic separator being of a material impermeable to the electrolyte.

4. In a storage battery, a plate containing active material, a shield for such material, consisting of a homogeneous sheet of fibrous cellulose material, provided with at least one parallelly indented or ribbed surface, permeable to the electrolyte, the said sheet folded around one end of the plate, the fold being parallel to the ribs, the sheet being applied to the faces of the plate, the fold being at the lower end of the plate, substantially for the purpose specified.

5. In a storage battery, a battery-plate, containing active material, presenting a face or faces of considerable area, a shield or retainer for such material, consisting of a homogeneous sheet of fibrous material, the fibers in which are parallel and provided with at least one parallelly indented or ribbed surface, permeable to the electrolyte, the said fibers being parallel to the ribs.

6. In a storage battery, a battery-plate containing active material presenting a face or faces of considerable area, a shield or retainer for such material, consisting of a homogeneous sheet of ribbed fibrous material in sheet form, permeable to the electrolyte, a corrugated separator pressing the sheet against the said face or faces, so disposed that the corrugations shall run at a substantial angle to the direction of the ribs.

ELMER A. SPERRY.

Witnesses:
W. S. ROGERS,
M. C. PRENDERGAST.